Nov. 27, 1951 — C. A. GIAUQUE — 2,576,592
VALVE CONSTRUCTION
Filed July 11, 1946 — 2 SHEETS—SHEET 1

Inventor:
Charles A. Giauque
By Joseph O. Lange, Atty.

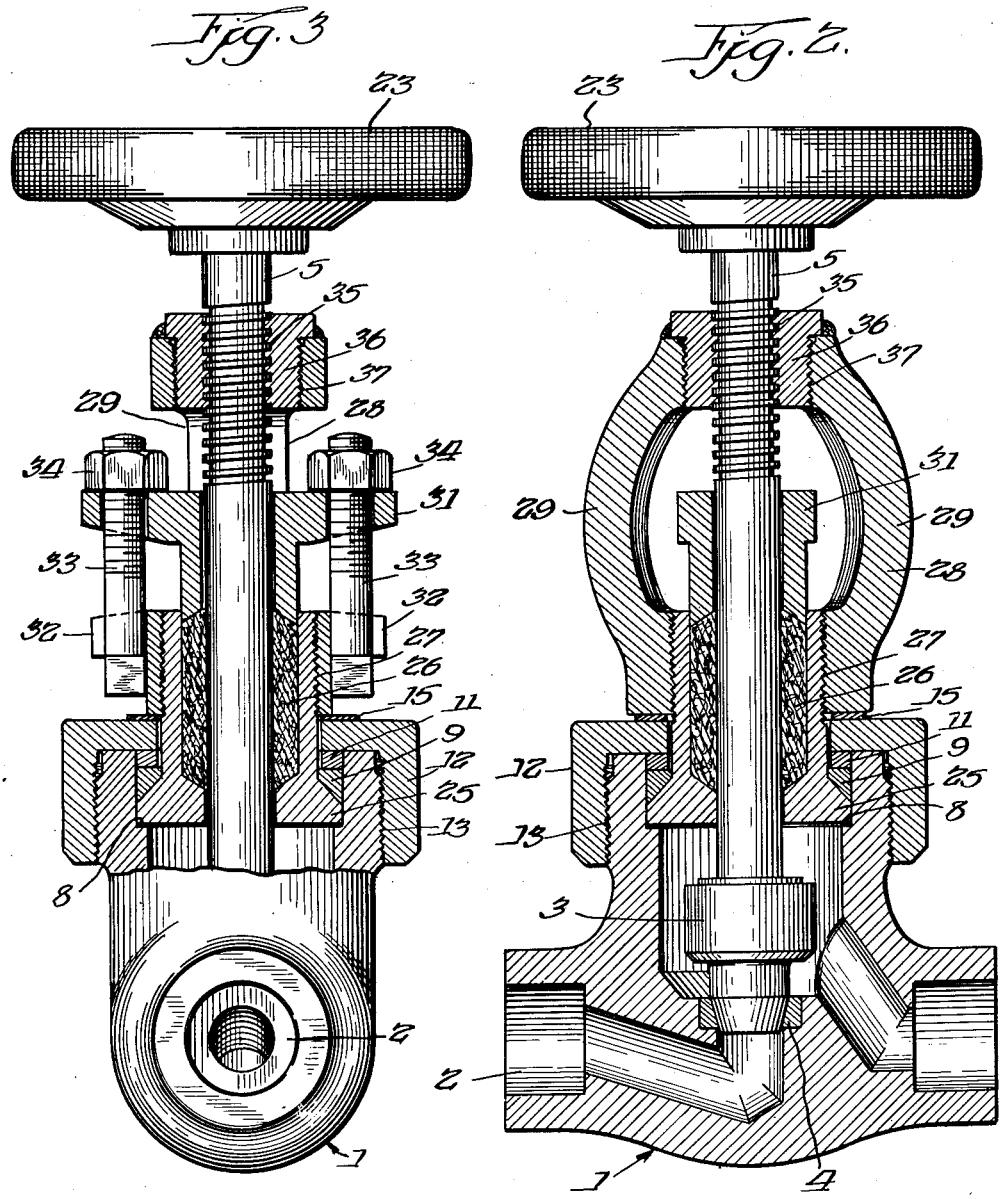

Patented Nov. 27, 1951

2,576,592

UNITED STATES PATENT OFFICE 2,576,592

VALVE CONSTRUCTION

Charles A. Giauque, Berwyn, Ill., assignor to Crane Co., Chicago, Ill., a corporation of Illinois Application July 11, 1946, Serial No. 682,877

2 Claims. (Cl. 251—50)

This invention relates to a novel valve construction and more particularly to a union bonnet yoke type of pressure sealing arrangement in which greater efficiency, compactness, economy of construction with increased strength are obtained.

Heretofore apparently no one has appreciated the advantages flowing from the use of a valve assembly in which a pressure sealing joint is used in combination with a union bonnet ring and a yoke, thereby permitting a substantially more sturdy stuffing box and gland construction such as the bolted type of gland and in which an insert member connecting the yoke to the body serves also to maintain a pressure-sealing assembly with the union bonnet ring and body.

A further important object of this invention is to provide a construction in which the yoke or the alternate construction employing a retaining ring serves as a means to make the initial compression of the gasket in effecting a pressure sealing joint.

Another object is to provide a construction in which the prior expensive coarse threading inside the bonnet ends of the casing is now replaced with the more simple sharp V-threads on the outside engaging a union ring or similar retaining means.

Another important object is to provide a bonnet or retaining member in which a specially treated metal may be used whereby the corrosion and wear resistance is reduced to a minimum. It has been found desirable for example to use siliconized steel for the bonnet and particularly in connection with the thread construction thereby avoiding objectionable wear and expediting greater ease in disassembling the valve parts. Heretofore in the relatively small size valves of the order of ½ inch to 1 inch inclusive for the higher pressures, such as 1500 lbs. per square inch, it has been impractical to obtain a construction permitting a pressure sealing bonnet connection without employing the heavy and more expensive arrangement followed in the larger sizes of valves.

By my construction a substantially light-weight and compact structure is provided possessing the necessary strength to withstand high pressures of the magnitude referred to.

Other important objects and advantages will become more readily apparent upon proceeding with the following specification read in light of the accompanying drawings in which Fig. 1 is a sectional assembly view of a preferred form of my invention.

Fig. 2 is a sectional assembly view of a modified form of my invention.

Fig. 3 is a sectional assembly at right angles to the view shown in Fig. 2.

Similar reference characters refer to like parts throughout the several views.

Figure 1:
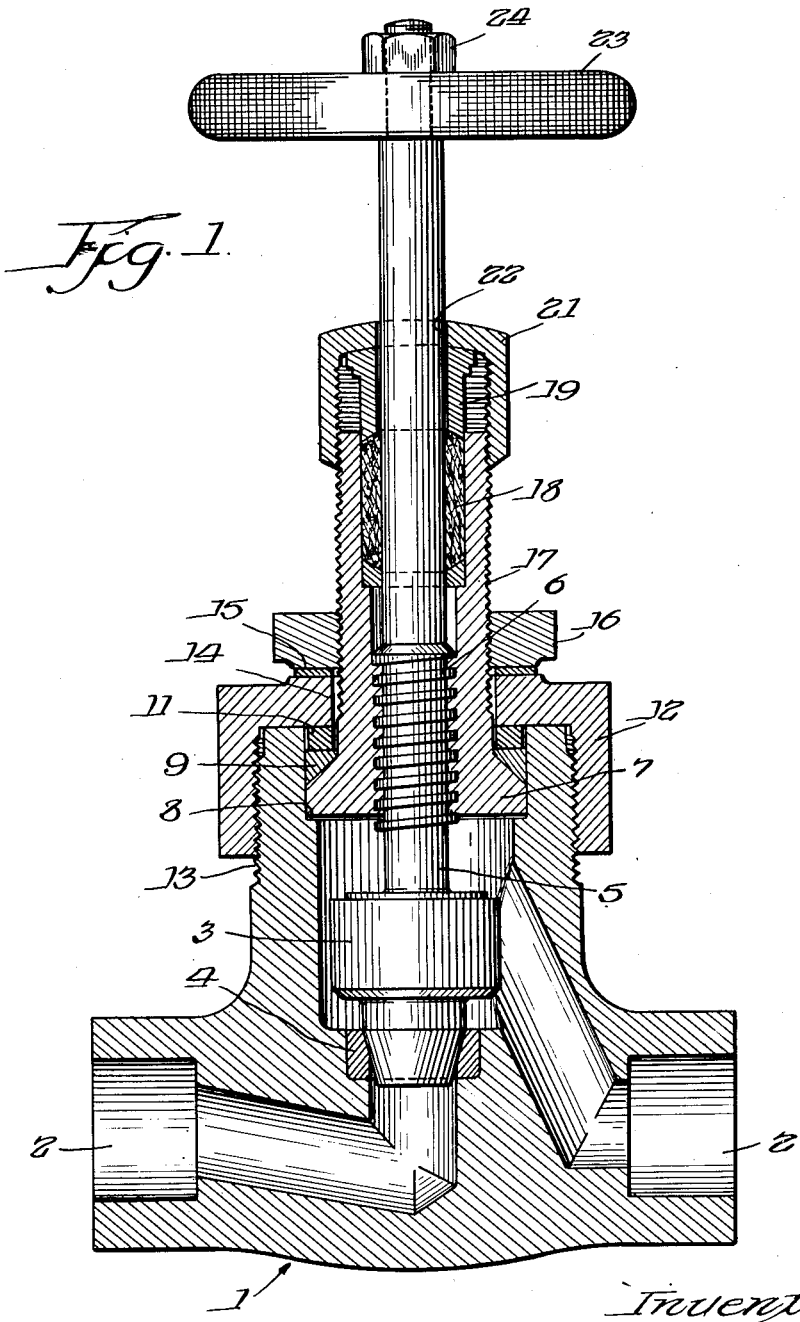

Referring now to Fig. 1 a conventional valve body or casing 1 is shown, which is provided with the usual pipe connecting ends which may be either the socket weld type as shown at 2 or with screwed or flanged connections as necessary depending upon the pipe line employed. Mounted therewithin for reciprocable movement in opening and closing the valve the closure member 3 is positioned bearing against the valve seat 4 and preferably swivelably connected to the stem 5 by means of a collar connection not shown. The stem is threadedly mounted as at 6 within the retaining member 7, the latter member being normally shouldered as at 8 within the casing 1 upon assembly as shown. The lower end portion of the retaining member 7 is enlarged as indicated, thereby permitting the use of a gasket or packing 9 with a follower ring 11 against which the inner surface portion of the bonnet ring 12 bears, the bonnet ring being threadedly attached as at 13 to the body as shown.

As indicated at 14 the central portion of the union bonnet ring is apertured to permit the projection therethrough of the threaded portion of the retaining member 7. Preferably upon the surfaces surrounding the aperture 14 a friction washer 15 is interposed, being located between the upper annular surface portion of the union ring 12 and a nut 16 which is threadedly mounted upon the threads 17 of the retaining member 7. At the upper portion of the retaining member a stuffing box 18 is provided which is packed as indicated. Superposed upon such packing is the gland 19 held in position by means of the threaded stuffing nut 21 and which is also apertured as at 22 to permit the upper portion of the stem 5 to project therethrough. Thus after the initial assembly has been made by hand tightening the union ring 12 sufficiently to thereby hold the said ring against the annular upper body shoulder as indicated, the nut 16 is then rotated upon the threads 17 to tighten against the friction washer 15 to thereby cause the retaining member 7 to be pulled upwardly with the packing 9 being compressed between the enlarged lower end portion of the member 7 and the follower ring 11, the lower surface of the packing 9 preferably, but not necessarily, bearing against an annular inclined surface as shown.

The friction ring 15 may be suitably treated with a coating or made of a metal to eliminate the normal amount of wear due to friction encountered during the course of tightening the member. The customary hand wheel 23 and the wheel nut 24 complete the valve assembly.

From the description above given, it should be apparent that one of the more important advantages arising from the use of my construction lies in its flexibility in permitting the use of the enlarged yoke construction which is normally found in the larger sizes of valves and which permits the use of a bolted type of stuffing box as distinguished from the screw thread type described in connection with Fig. 1. In addition it possesses the advantages of a pressure sealed joint whereby line pressure exerted against the inner end of the member 7 will serve to further compress the packing 9. The application of this desirable construction is perhaps more clearly shown in the modified form described in connection with Fig. 2. The bonnet ring 12 engages the threads 13 and shoulders against the body in the same manner as described in Fig. 1, the lower portion of the sleeve-like member 25 being received within the body opening and subsequently providing for compressing the gasket 9 in the same manner as described in connection with Fig. 1. Preferably within an inner annular portion of the member 25 and approximately in the plane of the gasket member 9 the stuffing box 26 is positioned. Around the outside of the stuffing box the threads 27 are provided upon which the yoke 28 is threadedly received, as indicated, and having a pair of oppositely disposed arms 29 between which the bolted gland 31 extends. In the opening between the arms 29 the yoke is provided with the lugs 32 for the T-bolt 33 having the nuts 34 for compressing the packing within the stuffing box 26. The upper portion of the stem 5 is threaded as indicated at 35, it being receivable within the threaded non-rotatable bushing 36 mounted within the yoke arm hub as at 37. It is clear therefore that both the outside screw and yoke and the inside screw valve constructions may be used embodying this invention.

Thus in a manner similar to that described in connection with the use of the nut 16 in Fig. 1, it will now become apparent that the yoke also serves as a nut in tightening down on the threads 27 thereby to compress the packing 9 between the enlarged end portion of the member 25 and the follower ring 11. Interposed therebetween a friction washer 15 is preferably used in the same manner as previously described. It is therefore clear that the fluid pressure within the valve body bearing against the lower or inner end portion of the retaining member 25 will further compress the packing 9 upon the continued application of line pressure within the valve. Thus the relatively sturdy construction of a yoke may be used together with the bolted gland 31 at the same time without sacrificing the compactness of the structure desirable in a small size valve. The valve is easy to assemble and to take apart for repairs or replacement, and yet it possesses the benefits of the larger types of valve.

It should be apparent from the above that a valve construction has been provided which combines the advantages of a union bonnet valve as well as the strength and sturdiness of a bolted yoke construction. It provides unusually accessible means for packing the valve and eliminates the necessity of having the usual excessively large and relatively weak union rings or retaining nuts. It is also to be noted that the connection between the bonnet and the yoke need not necessarily be pressure tight since the pressure sealing joint will provide for an adequate connection in the latter respect.

Many changes may of course be made in the details of construction without departing from the spirit and the scope of the invention as defined in the claims appended hereto.

I claim:

1. A pressure sealing joint, the combination including a body member with an inlet and outlet passage and an opening substantially transverse to the inlet and outlet passages, a valve stem in the opening, a yoke having a pair of spaced arms terminating in a valve stem guide at one end, a removable connecting element cooperating with the other end of said yoke arms, the said connecting element having an enlarged end portion snugly received within said body opening, a union nut connecting said yoke through said connecting element to said body member, the internal diameter of the union nut being less than the greatest distance across said arms, the connecting element being initially movable limitedly axially within the opening of said body member, packing means supported on the back of the enlarged end portion of the connecting element between said union ring, said connecting element and said body, the union nut effecting the initial compression of said packing means, the said yoke being threadedly mounted on the connecting element to bear against the said union nut whereby to provide for additional compression of said packing means upon assembly of the pressure sealing joint with the said body member.

2. In a valve, the combination including a body member with an inlet and outlet passage and an opening substantially transverse to the inlet and outlet passage, actuating means including a yoke having enlarged means terminating in a guide at one end for a portion of the actuating means, a removable connecting element cooperating with the other end of said enlarged means, the said connecting element having an enlarged end portion snugly receivable within the said body opening, a union nut connecting said yoke through said connecting element to said body member, the internal diameter of the union nut receiving a reduced portion of the connecting element and being less in diameter than the greatest distance across said yoke enlarged means, the connecting element being initially movable limitedly axially within the opening of said body member, packing means supported on the back of the enlarged end portion of the connecting element between said union ring, said connecting element and said body, the said yoke being threadedly mounted on the connecting element to bear against the said union nut whereby to provide for desired rotative position of the yoke relative to the said body and for additional compression of said packing means upon drawing the yoke against a top surface portion of the said union nut.

CHARLES A. GIAUQUE.

REFERENCES CITED

The following references are of record in the file of this patent:

UNITED STATES PATENTS

| Number | Name | Date |
|---|---|---|
| 1,689,799 | Nordstrom | Oct. 30, 1928 |
| 1,866,292 | Carlson | July 5, 1932 |
| 2,305,589 | Stark | Dec. 22, 1942 |
| 2,321,597 | Hobbs | June 15, 1943 |
| 2,389,118 | Buehner | Nov. 20, 1945 |
| 2,396,469 | Meigs | Mar. 12, 1946 |